(12) United States Patent
Lee et al.

(10) Patent No.: US 7,081,318 B2
(45) Date of Patent: Jul. 25, 2006

(54) BATTERY CONTAINER (75) Inventors: Jong-tae Lee, Changwon (KR); Min-soo Oh, Changwon (KR)

(73) Assignee: Samsung Techwin Co., Ltd. (KR)

( * ) Notice: Subject to any disclaimer, the term of this patent is extended or adjusted under 35 U.S.C. 154(b) by 345 days.

(21) Appl. No.: 10/664,849

(22) Filed: Sep. 18, 2003

(65) Prior Publication Data
US 2004/0053120 A1 Mar. 18, 2004

(30) Foreign Application Priority Data
Sep. 18, 2002 (KR) .................. 10-2002-0056814

(51) Int. Cl.
H01M 2/10 (2006.01)
H01M 2/00 (2006.01)

(52) U.S. Cl. .................. 429/97; 429/99; 429/1; 429/100

(58) Field of Classification Search .............. 429/97, 429/99, 1, 100
See application file for complete search history.

(56) References Cited
U.S. PATENT DOCUMENTS
4,645,325 A * 2/1987 Inoue et al. ............. 396/301

* cited by examiner

Primary Examiner—Dah-Wei Yuan
Assistant Examiner—Angela J. Martin
(74) Attorney, Agent, or Firm—St Onge Steward Johnston & Reens LLC (57) ABSTRACT A battery container capable of stably accommodating AA type batteries, a CRV3 battery, and a customized battery manufactured for exclusively use with a particular device. The battery container includes a main body which accommodates two AA type batteries, one CRV3 battery, or one customized battery wider than the CRV3 battery and having a first wrong-insertion preventing element in a lateral extension portion, and a cover which is opened or closed to allow a battery to be inserted into or drawn out of the main body and which keeps the battery in the main body during use. The main body includes an upper portion, a lower portion in which a wrong-insertion preventing protrusion for the CRV3 battery and a second wrong-insertion preventing element, which corresponds to the first wrong-insertion preventing element of the customized battery, are formed, a front portion having a front opening through which a battery is inserted or drawn out, a rear portion to which two rear electrodes contacting electrodes of the inserted battery are fixed, a first side portion, and a second side portion opposite to the first side portion. A front electrode plate which electrically connects a positive electrode and a negative electrode of the AA type batteries and supports the AA type batteries, the CRV3 battery, and the customized battery is attached to an inner wall of the cover.

20 Claims, 9 Drawing Sheets

BATTERY CONTAINER

CROSS-REFERENCES TO RELATED APPLICATIONS

This application claims the priority of Korean Patent Application No. 2002-56814, filed on Sep. 18, 2002, in the Korean Intellectual Property Office, the disclosure of which is incorporated herein in its entirety by reference.

BACKGROUND OF THE INVENTION

1. Field of the Invention

The present invention relates to a battery container, and more particularly, to a battery container for batteries of different sizes.

2. Description of the Related Art

A battery compartment construction for two different types of batteries is disclosed in Korean Utility Model Publication No. 1994-13688. This battery compartment construction merely accommodates two cylindrical batteries having different diameters and does not provide any means for preventing the batteries from being incorrectly inserted.

A battery container for a camera is disclosed in Korean Patent Publication No. 1990-8324). This battery container is exclusively for two different types of batteries, one thin and long and the other one thick and short. This battery container also does not have any means for preventing the two batteries from being incorrectly inserted.

Figure 1:
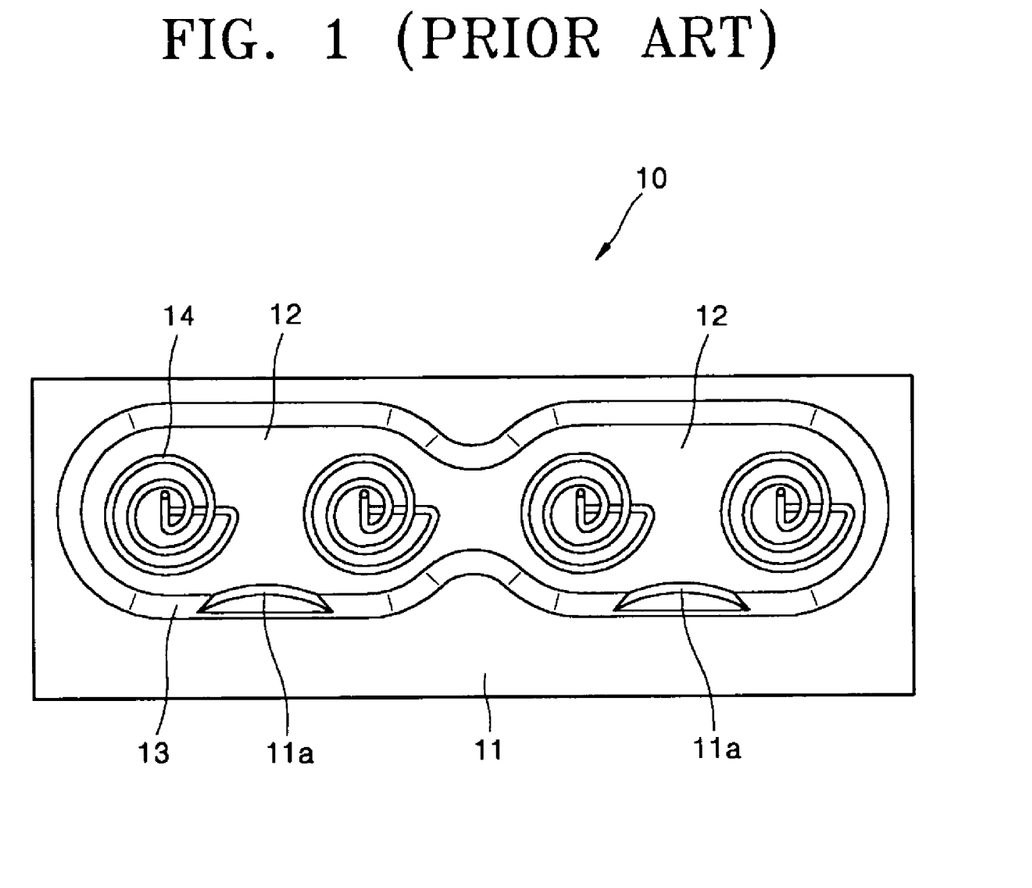
FIG. 1 is a front view of a conventional battery container for accommodating AA type batteries and CRV3 batteries.

FIG. 1 shows a conventional battery container 10 for a camera. The battery container 10 can accommodate four AA type batteries or two CRV3 batteries. The battery container 10 includes a front part 11 having an opening, through which batteries are inserted into or drawn out of the container in a lengthwise direction, a rear part 12 to which rear electrodes 14 that contact negative or positive electrodes of the batteries are attached, and a lower side part 13 with a protrusion 11a for preventing a CRV3 battery from being inserted in a wrong way. Although the battery container 10 is compatible with both AA type batteries and CRV3 batteries and has such a wrong-insertion preventing means for a CRV3 battery, it cannot accommodate a rechargeable, high-performance battery, which is specially manufactured for a particular device, such as a camera. Furthermore, the battery container 10 does not include a means for preventing AA type batteries from being incorrectly inserted.

SUMMARY OF THE INVENTION

The assignee of the present application has developed a rechargeable, high-performance battery which is customized for a particular electronic device, preferably for a camera. Such customized batteries are typically accommodated within a battery container specially adapted therefor.

However, it is desirable that such a battery container is compatible with commercially available AA type batteries or a CRV3 battery to be alternately used in a case where the rechargeable, customized battery is fully discharged.

To accomplish the compatibility of accommodating batteries, customized batteries can be designed to have a shape corresponding to the AA type batteries or CRV3 battery. However, in that case, it is difficult to improve performance of the customized battery, or otherwise the manufacturing cost may increase. When considering from the standpoint of cost saving, it's preferable to manufacture the customized battery using a commercially-standardized electrode assembly, which consists typically of a positive electrode plate, a negative electrode plate, and a separator interposed between the positive and negative electrode plates to prevent their direct contact. However, a customized battery manufactured with the standard electrode assembly may have a size different from the AA type batteries or CRV3 battery. Therefore, its battery container is desirable to be specially designed to accommodate such a customized battery, AA type batteries, and a CRV3 battery.

The size of an AA type battery, although standardized, varies slightly depending on the manufacturer. Accordingly, to adequately accommodate AA type batteries in a container, the battery container requires an additional element for fitting AA type batteries that are slightly smaller or larger than a standard size. If an AA type battery having a smaller diameter than a standard one is placed within the battery container without such a fitting element, the AA type battery can move within the battery container. This may lead to temporary disconnection of the battery from the electrodes of the battery container and may generate noise.

If a battery is incorrectly inserted into the battery container such that its positive and negative electrodes inversely match with the electrode terminals of the container and thereby electrically connected to a driving circuit of an electronic device such as a camera, the driving circuit may operate incorrectly or may be damaged. Therefore, it is desirable for the battery container to have a structure capable of preventing AA type batteries, a CRV3 battery, and a customized battery from being incorrectly inserted into the battery container or otherwise blocking an electrical connection if a wrong insertion was made.

The above-described camera of the assignee of the present application adopts a rechargeable, customized battery in a battery container of the invention and is designed to operate normally when a voltage difference between the electrodes of the customized battery is 3V to 3.7V. In addition, the camera can also normally operate at a voltage difference of 2V to 3V when two serially-connected AA type batteries or a CRV3 battery is received in the battery container. Likewise, many electronic devices often use a customized battery having an increased capacity or voltage.

Since the voltage difference between the electrodes can affect the operation of the driving circuit of the device, a means for detecting insertion of a customized battery into the battery container is preferable in order to use both different types of batteries. However, it is difficult to identify the type of battery based on a voltage difference detected on the electrodes, particularly when the detected voltage is about 3V. Therefore, it is also desired to provide a means for detecting insertion of a customized battery irrespective of a voltage difference of the electrodes.

In addition, since a rechargeable, customized battery is usually heavier than two AA type batteries or one CRV3 battery, a support means for securely supporting the customized battery is preferable in order to prevent a connection between the cover and the body of the battery container from breaking because of the weight of the customized battery.

Accordingly, the present invention provides a battery container that can alternately accommodate two AA type batteries, one CRV3 battery, or one customized battery particularly adapted for a specific electronic device such as a camera.

The present invention also provides a battery container that can securely accommodate any variance of commercially available AA type batteries.

The present invention also provides a battery container with an element capable of preventing a battery from being incorrectly inserted or otherwise preventing an electrical connection thereof after an incorrect insertion was made.

The present invention also provides a battery container with a customized battery identifying element.

The present invention also provides a battery container with an element for preventing a connection portion between the body and the cover of the battery container from breaking due to adoption of a heavier battery.

In accordance with an aspect of the present invention, a battery container is provided which comprises: a main body including a plurality of side portions and a rear portion and thereby defining at least a partial enclosure for accommodating at least one battery therein, the rear portion of the main body having a first and a second electrodes to provide a contact respectively with a first and a second electrodes of the at least one battery, the main body further defining a front opening for receiving and discharging the at least one battery there-through; and, a front electrode plate operably attached to the front opening of the main body such that, when the front electrode plate is in a closed position, an electrical connection can be achieved between the at least one battery positioned within the enclosure and the first and second electrodes of the rear portion of the main body via the front electrode plate to provide an electric current to the electric device; wherein the main body is configured to selectively accommodate therein either two AA type batteries, one CRV3 battery, or one customized battery adapted for use with the electric device.

The battery container of the present invention preferably includes a cover attachable over the front electrode plate for securely closing of the front opening of the main body. The main body of the battery container preferably includes at least one wrong-insertion preventing member for preventing incorrect insertion of the CRV3 battery and the customized battery into the enclosure of the housing.

The battery container of the invention also preferably includes a detection mechanism for detecting insertion of the customized battery within the enclosure of the main body. The battery container of the invention also preferably includes means for blocking an electrical connection between at least one of the AA type batteries and the front electrode plate when the AA type batteries are inserted within the enclosure of the main body in a wrong direction.

According to another aspect of the present invention, a battery container is provided which comprises: a housing defining at least a partial enclosure for accommodating at least one battery therein, the housing including a wall portion with a first and a second electrodes disposed thereon to provide a contact respectively with a first and a second electrodes of the at least one battery, the housing further defining an opening for receiving and discharging the at least one battery there-through; and, a covering member including a conductive element disposed at an inner surface thereof and being operably attached to the opening of the housing such that, when the covering member is in a closed position, an electrical connection can be achieved between the at least one battery positioned within the enclosure, the first and second electrodes of the wall portion of the main body, and the conductive element of the covering member to provide an electric current to the electric device; wherein the housing is configured to selectively accommodate therein either two AA type batteries, one CRV3 battery, or one customized battery particularly adapted for use with the electric device. The conductive element of the covering member is preferably in the form of an electrode end-plate operably associated with the covering member.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE DRAWINGS

Prior to detailed descriptions on preferred embodiments of the present invention, batteries which can be accommodated in a battery container of the present invention are described with reference to FIG. 2A through FIG. 2C.

Figure 2A:
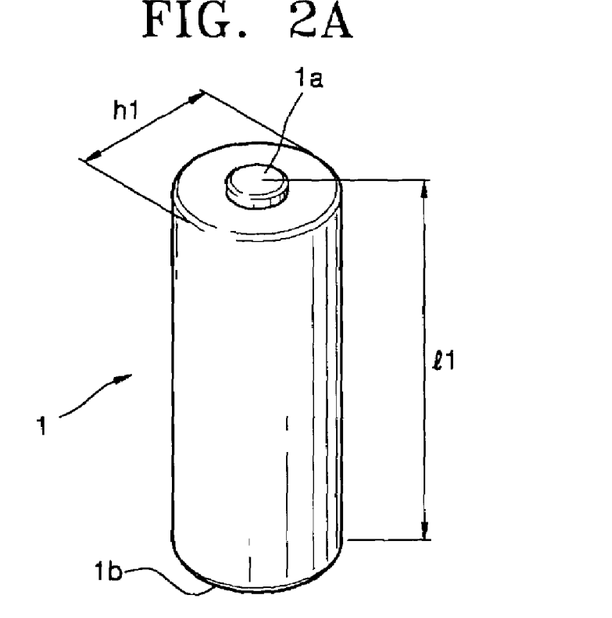
FIG. 2A is a perspective view of an AA type battery.

The battery shown in FIG. 2A is an AA type battery 1 with a positive electrode 1a and a negative electrode 1b at each end thereof. An AA type battery is standardized to have a diameter h1 of 14.5 mm or less, and it typically has a diameter of approximately 14.4 mm and a length t1 of approximately 50.5 mm. Two AA type batteries are to be inserted into the battery container of the present invention in a manner such that each of the AA type batteries is oppositely oriented to the other.

Figure 2B:
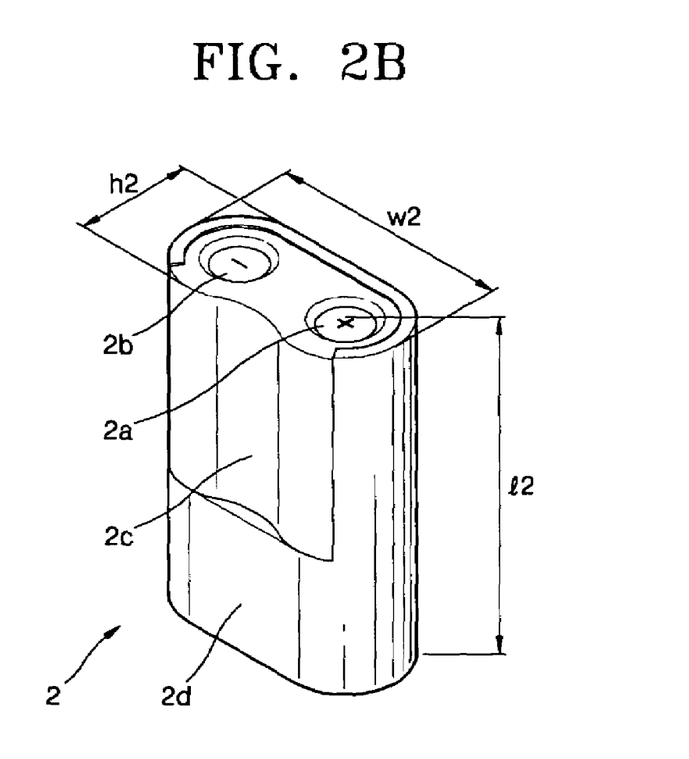
FIG. 2B is a perspective view of a CRV3 battery.

The battery shown in FIG. 2B is a CRV3 battery 2 with a positive electrode 2a and a negative electrode 2b disposed at a same end. The CRV3 battery 2 has a shape generally corresponding to two AA type batteries combined together. In general, the CRV3 battery has a height h2 of about 14.4 mm, a width w2 of about 28.8 mm, and a length l2 of about 52 mm, which is slightly longer than an AA type battery. One special feature of the CRV3 battery 2 lays in that it has a recessed portion 2c at a wide side thereof, which is to be coupled with a wrong-insertion preventing protrusion of the battery container, and a flat portion 2d disposed below the recessed portion 2c in a longitudinal direction. This configuration of the CRV3 battery is for preventing the battery with the positive and negative electrodes from being incorrectly inserted into the battery container. This will be described in detail later. The positive and negative electrodes of the CRV3 battery are respectively formed in a recess.

Figure 2C:
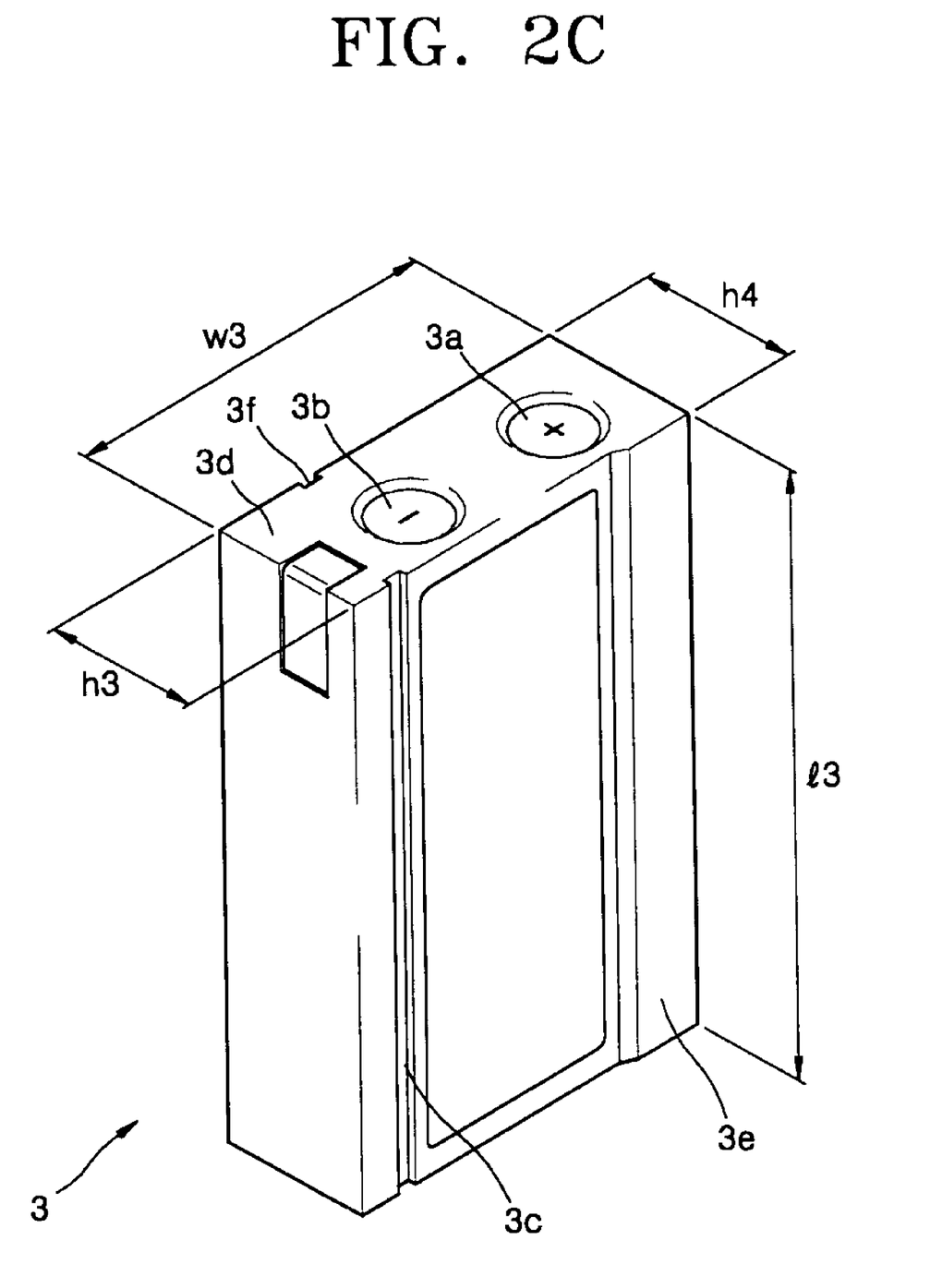
FIG. 2C is a perspective view of one embodiment of a rechargeable, customized battery which is particularly adapted for a camera of the applicant.

The battery of FIG. 2C is one embodiment of a customized battery to be usable with the battery container of the present invention, and has a positive electrode 3a and a negative electrode 3b disposed at a same end thereof. This battery also includes a circuit portion 3e which laterally extends slightly wider and includes circuits therein. The circuit portion 3e has a height h4 of 13.4 mm and a width of 6 mm. A non-circuit portion has a height h3 of 12.4 mm. The battery of FIG. 2C has a width w3 of 31.8 mm, which is greater than the CRV3 battery, and a length l3 of 52 mm, which is equal to the length of the CRV3 battery. The dimensions of this type of customized batteries are often limited by the dimensions of a standardized electrode assembly introduced therein, that is typically produced on a mass scale and included. This battery further includes a lateral extension portion 3d, which extends laterally further than that of the CRV3 battery. Like CRV3 batteries, both electrodes of the customized battery are formed within a recess from the surface. To prevent the customized battery from being incorrectly inserted within the battery container, a wrong-insertion preventing element 3c is formed in one side of the lateral extension portion 3d. Although the wrong-insertion preventing element 3c is illustrated in FIG. 2C as being recessed along a lengthwise direction of the battery, the wrong-insertion preventing element 3c may be formed as a protrusion. The customized battery includes an upper-protrusion receiving portion 3f formed in a side opposite to and in a location generally corresponding to the wrong-insertion preventing element 3c. The voltage difference between two electrodes of the customized battery ranges from 3V to 3.7V, however, the voltage difference between two serially connected electrodes of AA type batteries and that of a CRV3 battery range from 2V to 3V. Such a variation in the voltage difference affects the operation of a driving circuit of the electronic device (e.g., a camera). Therefore, it is preferable that the battery container further includes a means for detecting whether a customized battery is inserted.

Preferred embodiments of the battery container according to the present invention will be described in detail with reference to the appended drawings.

Figure 3:
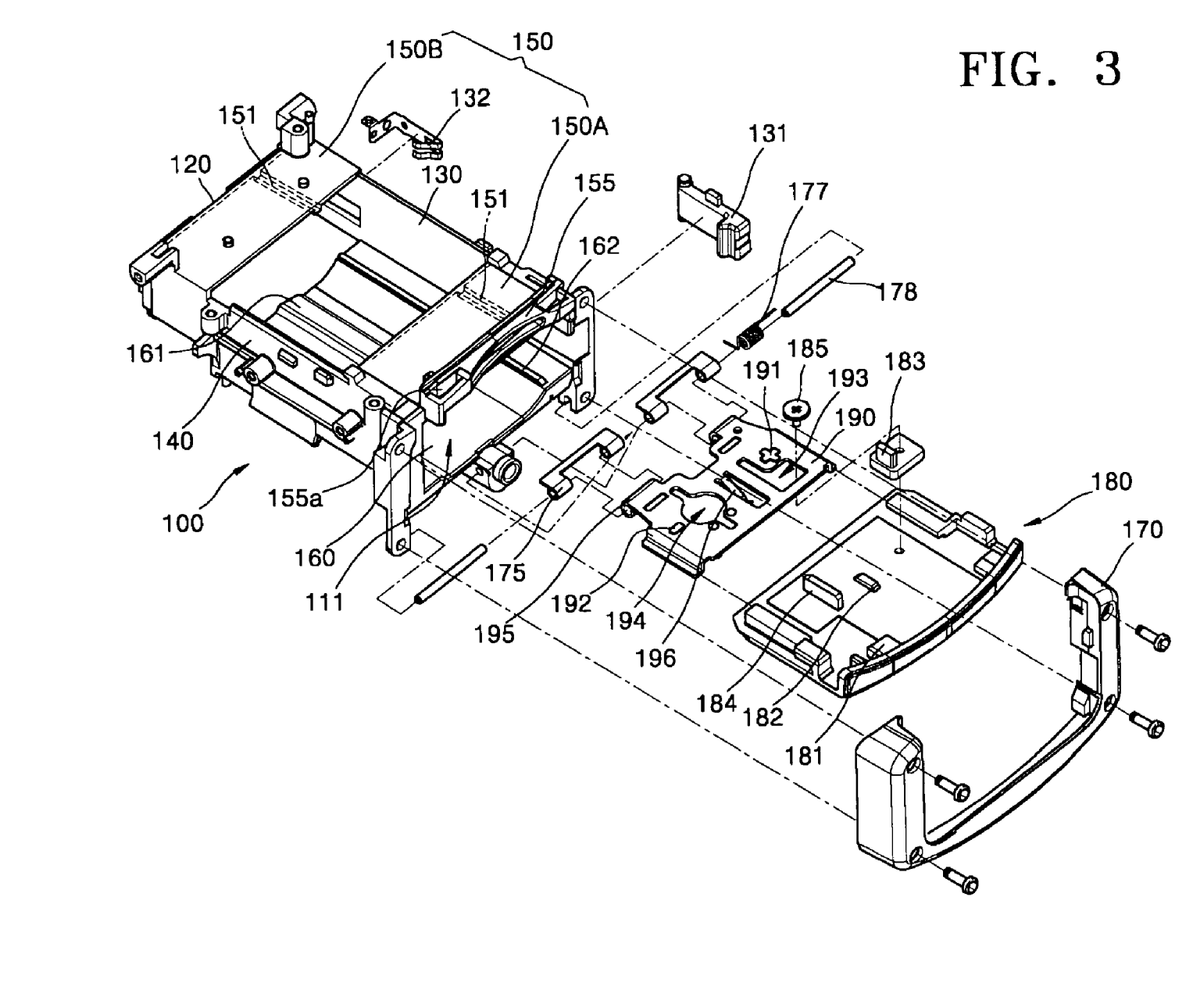
FIG. 3 is an exploded perspective view of a battery container according to an embodiment of the present invention.

FIG. 3 is an exploded perspective view of a battery container according to an embodiment of the present invention. The battery container of FIG. 3 includes a main body 100 and a cover 180. The main body 100 can accommodate two AA type batteries 1, a CRV3 battery 2, or a customized battery 3. The cover 180 may be opened to allow the batteries to be inserted into or drawn out of the battery container and keeps the batteries within the battery container during use. The internal volume of the battery container according to the present invention is nearly one-half of the internal volume of the conventional battery container of FIG. 1. This is because the structure of the battery container of FIG. 3 is particularly designed to accommodate one customized battery. However, the battery container of FIG. 3 is also compatible with two AA type batteries and one CRV3 battery to allow a customer to replace a fully discharged customized battery by two AA type batteries or one CRV3 battery.

As described above, the customized battery 3 includes the wrong-insertion preventing element 3c preferably as a groove formed along the lengthwise direction of the lateral extension portion 3d of the customized battery 3. Correspondingly thereto, a corresponding wrong-insertion preventing element 162 is formed in a lower portion 160 of the main body 100, which will be described later, preferably as a protrusion for engaging with the first wrong-insertion preventing element 3c of the customized battery 3. This structural correspondence between the former and latter wrong-insertion preventing elements 3c and 162 is for preventing the customized battery from being incorrectly inserted. Although in the embodiment the wrong-insertion preventing element 3c is formed as a groove and the wrong-insertion preventing element 162 is formed as a protrusion, the wrong-insertion preventing element 2c may optionally be formed as a protrusion and the corresponding wrong-insertion preventing element 162 as a groove. However, the latter wrong-insertion preventing element 162 is preferably formed as a protrusion because it can support an AA type battery alternatively inserted within the right side of the battery container toward a second side portion 140 of the main body 100, along with an upper protrusion 151.

The main body 100 defines a housing of the battery container, and preferably includes a front upper portion 150A, a rear upper portion 150B, a lower portion 160, a front portion 110, a rear portion 120, a first side portion 130, and a second side portion 140.

Although, in this embodiment, an upper portion 150 of the main body 100 is described as having the front and rear upper portions 150A and 150B, the front and rear upper portions 150A and 150B may be formed as a single integrated body. Alternatively, the upper portion 150 of the main body 100 may be formed of left and right upper portions. In which case, the left and right upper portions can be integrated with the first and second side portions 130 and 140, respectively. Although, in the embodiment, the upper portion 150 of the main body 100 is illustrated as being flat, the shape of the upper portion is not limited to this. Each of the front and rear upper portions 150A and 150B has an upper protrusion 151 in a right bottom surface close the second side portion 140 to support (among two batteries) an AA type battery 1 inserted within the right portion of the battery container, preferably biasing towards the second side portion 140. The upper protrusion 151 enables various AA type batteries which are manufactured by different makers and are slightly larger or smaller than the standard size to be stably and tightly engaged with the battery container.

The upper protrusion 151 is displaced slightly outward from the center of an AA type battery inserted in the right side of the battery container. The protruded height of the upper protrusion 151 is determined such that a larger diameter AA type battery can be inserted and a smaller diameter AA type battery can be effectively supported. Although in this embodiment the upper protrusion 151 is formed to extend in a direction in which batteries are inserted, the upper protrusion 151 may be formed as discrete protrusions. The position and size, such as height, of the upper protrusion 151 are determined depending on the size of commercially available AA type batteries.

The upper portion 150 has a front protrusion 155 on the front edge thereof. The front protrusion 155 has a cover hook receiving portion 155a, which couples with a cover hook 181 of the cover 180 described later.

The lower portion 160 includes a wrong-insertion preventing protrusion 161 for a CRV3 battery, and a wrong-insertion preventing element 162 which corresponds to the wrong-insertion preventing element 3c of the customized battery of FIG. 2C. The wrong-insertion preventing protrusion 161 for a CRV3 battery has a shape corresponding to the recessed portion 2c (FIG. 2B) formed on a standard CRV3 battery. Alternatively, the wrong-insertion preventing protrusion 161 may be formed smaller than the recessed portion 2c for easy insertion of the CRV3 battery as far as it can prevent the wrong insertion of the CRV3 battery. The wrong-insertion preventing element 162 has a shape corresponding to the wrong-insertion preventing element 3c formed in the lateral extension portion 3d of the customized battery, as described above. The lower portion 160 may be integrated with the first and second side portions 130 and 140 described later to more effectively support the batteries.

The main body 100 has a front opening 111 through which an AA type battery, a CRV3 battery, and a customized battery can be inserted or drawn out in a lengthwise direction. The dimensions of the front opening 111 are large enough to accommodate two AA type batteries, a CRV3 battery, and a customized battery.

A cover surrounding member 170 is attached around to the front opening 111 of the main body 100. A hinge member 175 is installed onto a front edge of the lower portion 160 of the main body 100. The hinge member 175 couples with a corresponding hinge 195 of a front electrode plate 190 described later.

Figure 4:
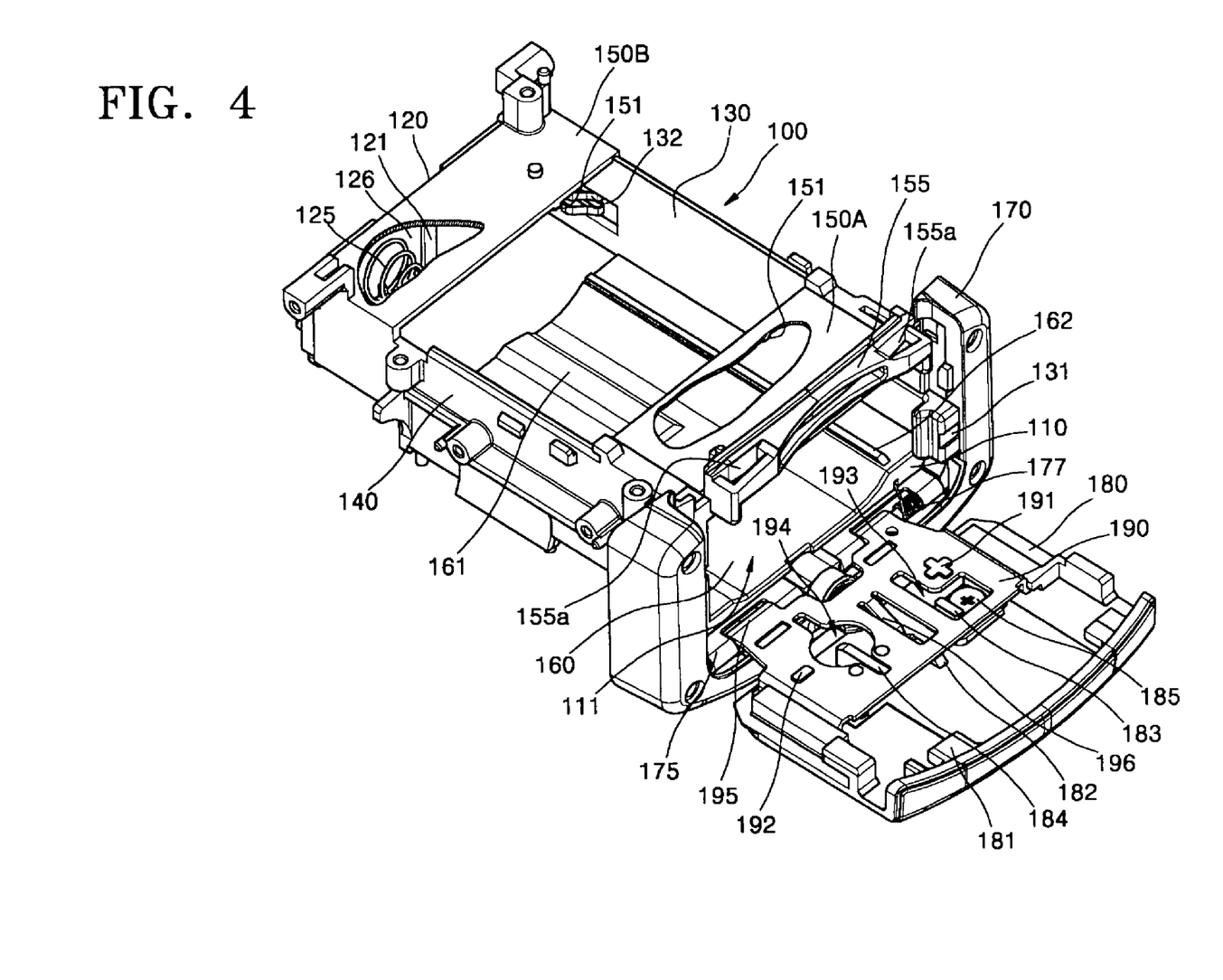
FIG. 4 is a perspective view of an assembled battery container according to the present invention.

As shown in FIG. 4, two rear electrodes 125, which is configured to contact the electrodes of the batteries, are fixed to the rear portion 120 of the main body 100. It is preferable that the rear electrodes 125 are formed of a conductive elastic member for tighter contact with the batteries. Although the rear electrodes 125 are illustrated in FIG. 4 as coil springs, the rear electrodes 125 may be formed as plate springs. A wire (not shown) may be directly connected to the spring coil type rear electrodes 125 to supply power to a driving circuit of the electronic device (i.e., a camera). However, in this embodiment, a wire for power supply is connected to the driving circuit via a conductive plate 126, which is fixed to the rear portion 120 and to which the rear electrodes 125 are welded.

Figure 8:
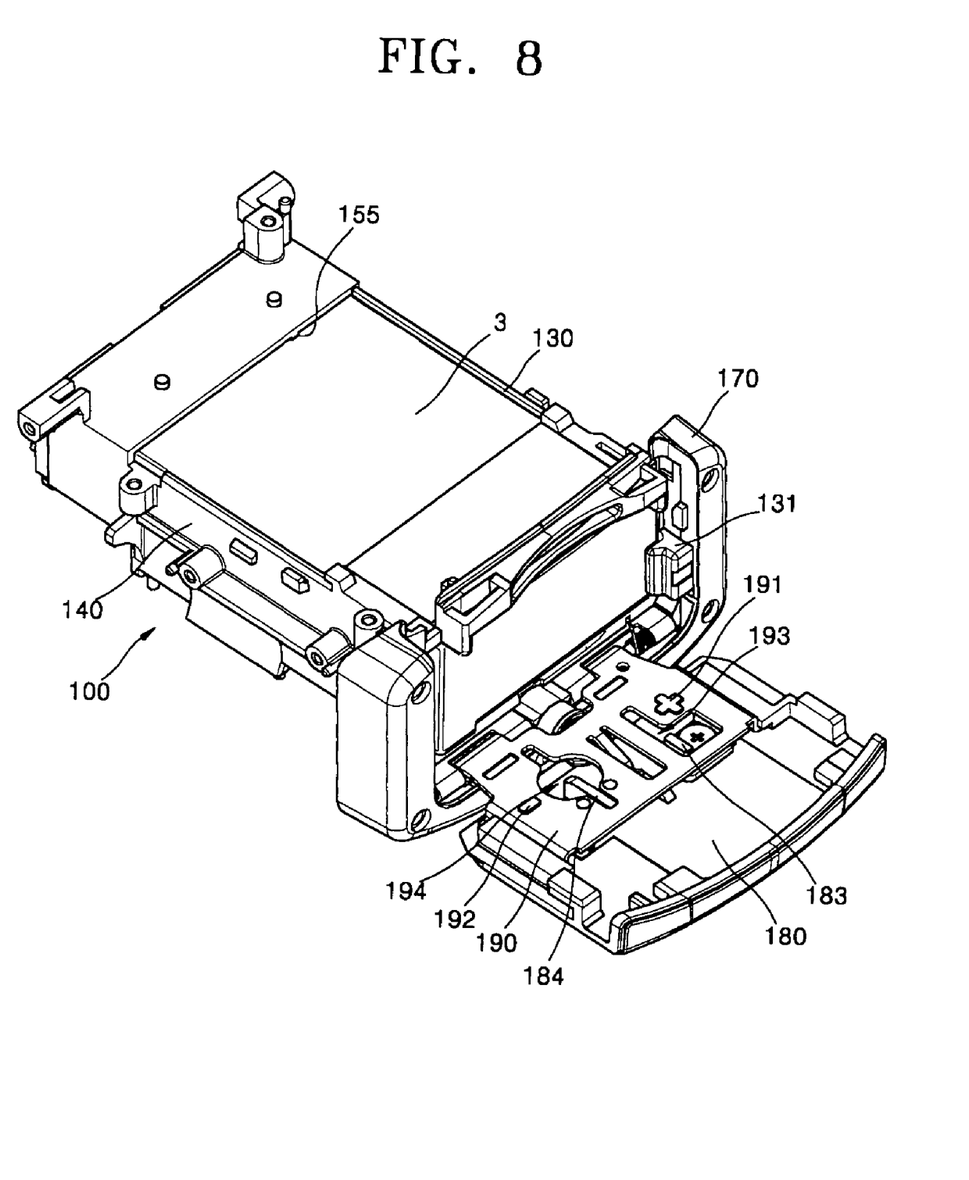
FIG. 8 is a perspective view of a battery container according to the present invention when a customized battery is correctly inserted.

In the present disclosure, the first side portion 130 refers to a side of the main body 100 which is adjacent to the lateral extension portion 3d of the customized battery 3 when it is inserted into the main body 100. A holding member 131 for holding the customized battery is installed at the front edge of the first side portion 130 to prevent the customized battery from coming out of the battery container. As shown in FIG. 3, the holding member 131 has a laterally projecting front portion and thinner middle and rear portions. The front projecting portion includes a sloped edge at the front end thereof, and when the customized battery 3 is inserted into the main body 100, the slopped front projecting portion of the holding member 131 is pushed outward (to the right in FIG. 4) so that the customized battery 3 can be inserted through the front opening 111 into the main body 100. After the customized battery 3 is fully inserted into the main body 100, the slopped, front projecting portion of the holding member 131 returns to the initial position before being pushed and holds a front end of the customized battery 3. In order to remove the customized battery 3 from the main body 100, the holding member 131 is pushed outward by a user. The customized battery 3 is heavier than an AA type battery or a CRV3 battery, and thus the cover 180 is easy to break when the battery container containing the customized battery 3 is severely shaken or subject to an impact. However, according to the present invention, due to the holding member 131 supporting the customized battery 3 (as shown in FIG. 8), the cover 180 is unlikely to be broken.

A customized battery detecting member 132 is installed at a rear portion of the first side portion 130. The customized battery detecting member 132 is formed and installed to protrude such that only the customized battery having a larger width, but not the AA type battery 1 and CRV3 battery 2, can reach it. The customized battery detecting member 132 may detect insertion of the customized battery 3 either by a mechanical method, an electrical method, or a combination of the two methods, are that are conceivable by a person of ordinary skill in the art. The customized battery detecting member 132 is associated with the driving circuit of the device (e.g., a camera). The driving circuit operates in a different manner depending on the type of battery inserted in the main body 100. This is because the voltage difference between the positive and negative electrodes of the customized battery differs from the voltage difference of the other two types of batteries, as described above.

The second side portion 140 is positioned opposite to the first side portion 130. Like the first side portion 130, the second side portion 140 is connected respectively with the front portion 110, the front upper portion 150A, the rear upper portion 150B, the lower portion 160, and the rear portion 120. It is preferable that the second side portion 140 is integrally formed with each of the first side portion 130, the front portion 110, the front upper portion 150A, the rear upper portion 150B, the lower portion 160, and the rear portion 120.

The cover 180 opens and closes the front opening 111 and basically keeps the battery 1, 2, or 3 within the battery container during use. The cover 180 has the cover hook 181 at an edge. The cover hook 181 has a shape corresponding to the cover hook receiving portion 155a formed in the front protrusion 155 of the upper portion 150 as described above.

The front electrode plate 190, which electrically connects a positive electrode of one AA type battery and a negative electrode of the other AA type battery, is slidably attached to the inside of the cover 180. The hinge 195 of the front electrode plate 190 is hinged with the hinge member 175. The front electrode plate 190 is made of a metal plate. In general, the hinge 195 is formed by rolling an end portion of such a metal plate. Since the front electrode plate 190 is slidably attached to the inside of the cover 180, the front electrode plate 190 slides on the inner surface of the cover 180 when the cover 180 is opened or closed.

The hinge 195, the hinge member 175, a hinge rod 178 passing through the openings of the hinge 195 and the hinge member 175, and a spring 177 whose one end is supported by the front portion 110 and the other end is supported by the cover 180 work together to apply a self-opening force to the cover 180. Due to the self-opening force, the cover 180 can be automatically opened as soon as the cover hook 181 is released from the cover hook receiving portion 155a.

The front electrode plate 190 includes a positive electrode contact 191 for contacting the positive electrode of one AA type battery, and a negative electrode contact 192 for contacting the negative electrode of the other AA type battery. A first through hole 193 is disposed adjacent to the positive electrode contact 191, and a second through hole 194 at a location corresponding to the center of the negative electrode of the AA type battery, which is large enough to receive the projected, positive electrode of an AA type battery there-through without making an electrical connection 232 therebetween. A plate spring 196 is also disposed on the electrode plate 190.

It is preferable that the positive electrode contact 191 and the negative electrode contact 192 are formed slightly protruding from the surface of the front electrode plate 190.

The plate spring 196 is formed at the electrode plate 190, projecting toward the cover 180. A free end of the plate spring 196 slides along a cover protrusion 182 formed on the inner wall of the cover 180. The cover protrusion 182 has a center portion which is higher than its end portions. The movement of the plate spring 196 along the cover protrusion 182 provides a feeling of smooth operation as it supplies an adjusted cushion particularly at the beginning and end of the sliding movement. However, the plate spring 196 and the cover protrusion 182 are optional.

The cover 180 further comprises a negative electrode blocking portion 183 and a positive electrode blocking portion 184 on the inner wall thereof. The height of the negative electrode blocking portion 183 is designed to protrude, upon closing of the cover 180, through the first through hole 193 at a predetermined height beyond the projected surface of the positive electrode contact 191. The height of the negative electrode blocking portion 183 projecting beyond the surface of the positive electrode contact 191 is, however, smaller than the projected height of the positive electrode 1a of the AA type battery. On the other hand, the height of the positive electrode blocking portion 184 is designed to protrude, upon closing of the cover 180, within the second through hole 194 at a predetermined height below the surface of the negative electrode contact 192. The negative electrode blocking portion 183 protruding adjacent to the positive electrode contact 191 and the positive electrode blocking portion 184 protruding adjacent to the negative electrode contact 192 respectively prevent an electrical connection when AA type batteries are incorrectly inserted.

FIG. 4 is a perspective view of an assembled battery container according to the present invention with a cover that is opened. Opening and closing the front opening 111 of the main body 100 with the cover 180 will be described. When closing the front opening 111, the hinged cover 180 with the front electrode plate 190 is pushed toward the front portion 110 so that the cover hook 181 is pushed downward and engages the cover hook receiving portion 155a of the front protrusion 155. The cover 180 can be automatically opened by the spring 177 as soon as the cover hook 181 is released from the cover hook receiving portion 155a.

Figure 5:
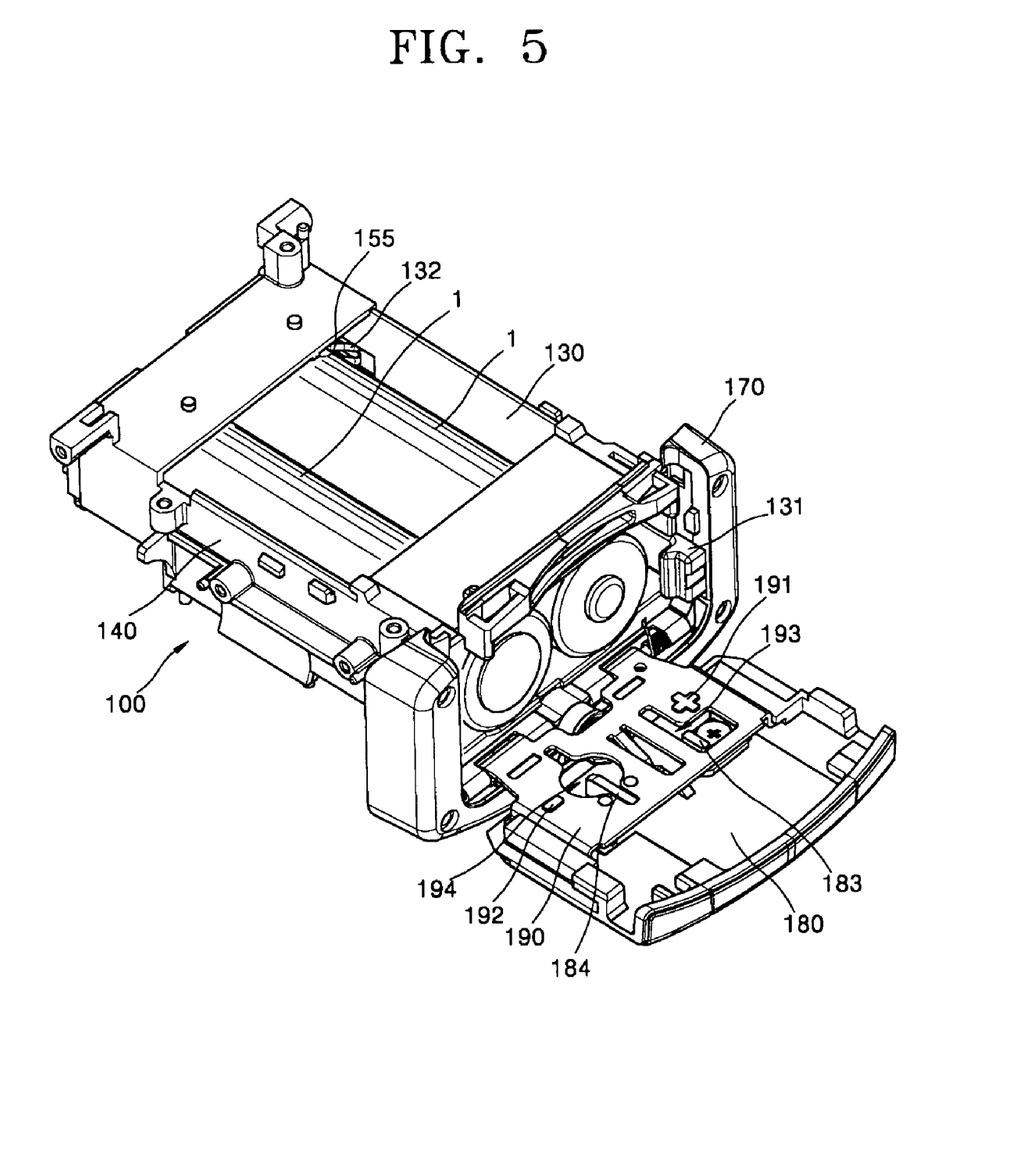
FIG. 5 is a perspective view of a battery container according to the present invention when AA type batteries are correctly inserted.

FIG. 5 is a perspective view of the battery container according to the present invention when the AA type batteries 1 are correctly inserted such that the negative electrode of the one AA type battery in the left side of the battery container and the positive electrode of the other AA type battery in the right side of the battery container match the negative electrode contact 192 and the positive electrode contact 191 of the front electrode plate 190, respectively. The two AA type batteries are electrically connected in series through the front electrode plate 190. The other electrodes of the AA type batteries away from the front electrode plate 190 are electrically connected with the rear electrodes 125 (FIG. 4). The upper protrusion 151 biases the AA type battery 1 positioned adjacent to the first side portion 130 in the left direction.

Figure 6A:
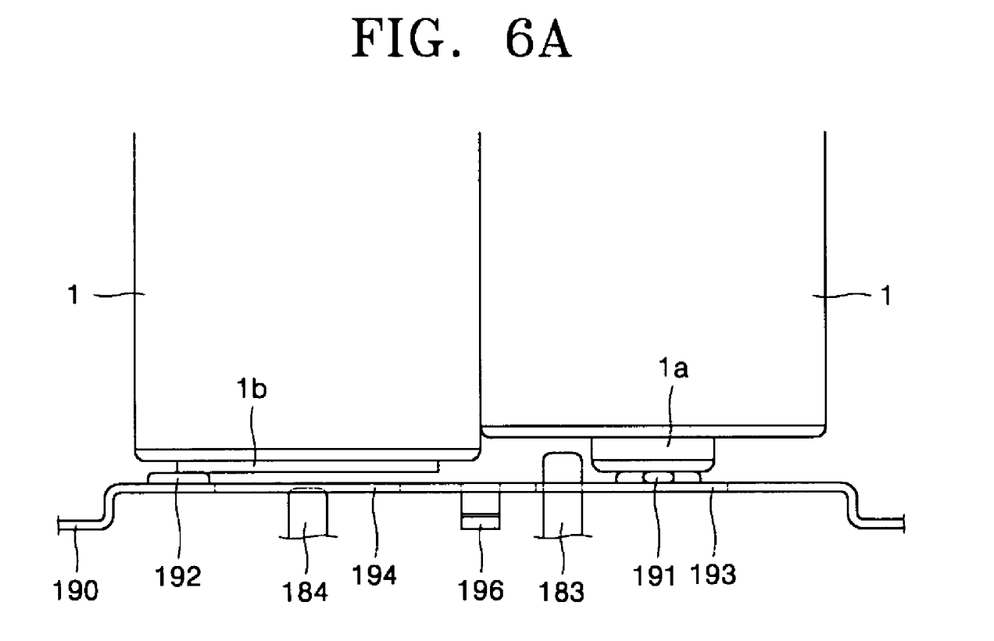
FIG. 6A is a plan view showing AA type batteries which are correctly engaged with a front electrode plate of the battery container, according to one embodiment of the present invention.
Figure 6B:
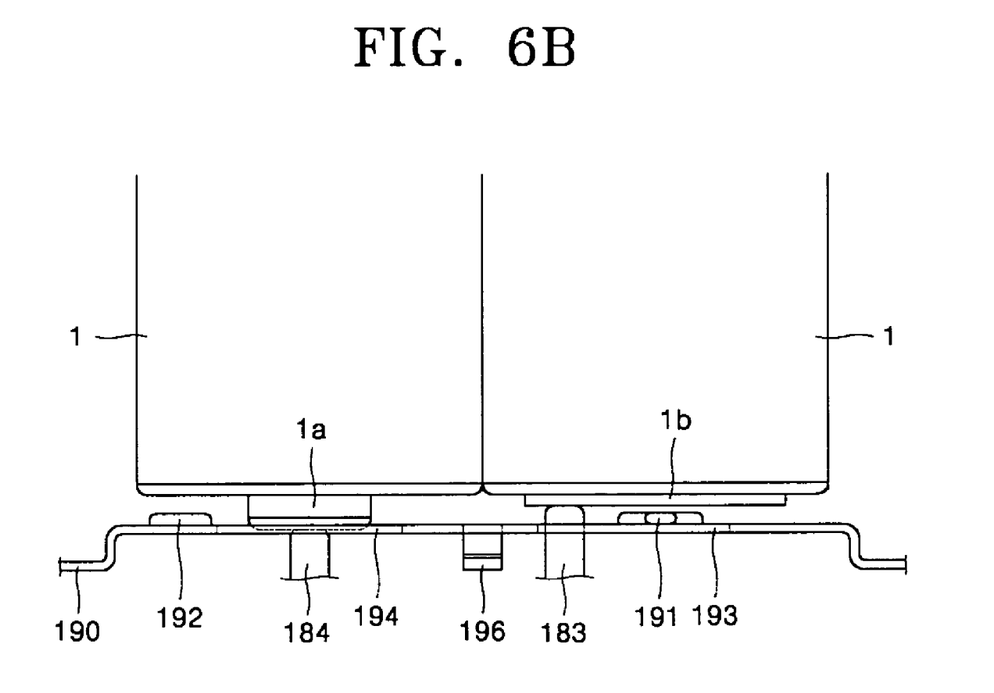
FIG. 6B is a plan view showing AA type batteries which are incorrectly engaged with the front electrode plate of the battery container of the present invention.

FIG. 6A is a plan view showing AA type batteries correctly inserted within the battery container, and FIG. 6B is a plan view showing AA type batteries incorrectly inserted within the battery container. In FIG. 6A, the positive electrode of the battery in the right side of the battery container is electrically connected with the negative electrode of the battery in the left side of the battery container via the positive electrode contact 191 and the negative electrode contact 192 of the front electrode plate 190. However, in FIG. 6B, where the negative electrode of the AA type battery in the right side of the battery container and the positive electrode of the AA type battery in the left side of the battery container are respectively positioned to match the positive electrode contact 191 and the negative electrode contact 192, respectively, the negative electrode of the AA type battery in the right side is prevented from being electrically connected with the positive electrode contact 191 by the negative electrode blocking portion 183 of the cover 180, and the positive electrode of the AA type battery in the left side is prevented from being electrically connected with the negative electrode contact 192 by the positive electrode blocking portion 184 of the cover 180. The two incorrectly inserted AA type batteries can be protected from mutual electrical connection if at least one of the negative electrode blocking portion 183 and the positive electrode blocking portion 184 is properly functioned.

Figure 7:
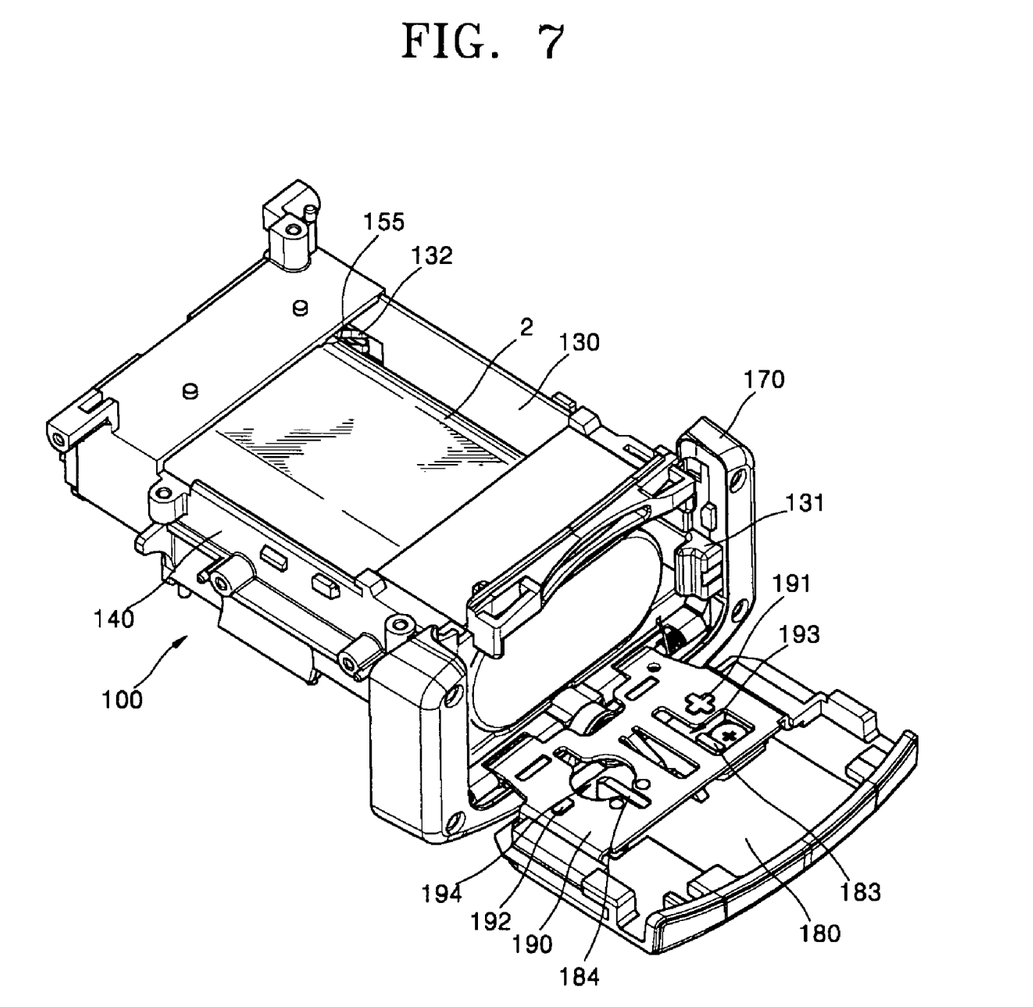
FIG. 7 is a perspective view of a battery container according to the present invention when a CRV3 battery is correctly inserted.

FIG. 7 is a perspective view of the battery container according to the present invention when a CRV3 battery is correctly inserted. In FIG. 7, electrodes 2a and 2b of the CRV3 battery are electrically connected with the rear electrodes 125 of the battery container 100, and the wrong-insertion preventing protrusion 161 (FIG. 4) for a CRV3 battery, which is formed in the lower portion 160 of the main body 100, is fitted into the recessed portion 2c of the CRV3 battery. A positive electrode of the CRV3 battery is electrically connected with one of the rear electrodes 125 in the left side, and a negative electrode of the CRV3 battery is electrically connected with the other rear electrode 125 in the right side. The other end of the CRV3 battery opposite to its positive and negative electrodes is supported by the front electrode plate 190.

FIG. 8 is a perspective view of the battery container according to the present invention when a customized battery is correctly inserted. In FIG. 8, electrodes 3a and 3b of the customized battery are electrically connected with the rear electrodes 125 of the battery container, and the second wrong-insertion preventing element 162 (FIG. 4), which is formed in the lower portion 160 of the main body 100, is fitted into the first wrong-insertion preventing element 3c of the customized battery. Also, the upper protrusions 151 on the front and rear upper portions 150A and 150B of the main body 100 are fitted into the upper protrusion receiving portion 3f of the customized battery. A positive electrode of the customized battery is electrically connected with one of the rear electrodes 125 in the left side, and a negative electrode of the customized battery is electrically connected with the other rear electrode 125 in the right side. The other end of the customized battery opposite to its positive and negative electrodes is supported by the front electrode plate 190. The customized battery detecting member 132 (FIG. 4) detects the insertion of the customized battery, and the holding member 131 holds the customized battery which is locked under the projected head portion of the holding member 131.

As described above, the battery container according to the present invention can selectively accommodate either AA type batteries, a CRV3 battery, or a customized battery specially adapted for use with a particular device. The battery container can stably accommodate any AA type batteries and can prevent an incorrectly inserted battery from being electrically conducted. The battery container according to the present invention has a customized battery detecting member, so that a driving circuit of a particular device can be optimally operated even in the presence of the voltage difference between the applicable batteries. In addition, the battery container according to the present invention has a holding member to prevent breakage when severely shaken or externally impacted.

Although in the above embodiments the present invention has been described with reference to a battery container particularly for a camera, the present invention is not limited to the battery container for a camera, and the features of the present invention can be applied to an arbitrary battery container capable of accommodating AA type batteries, CRV3 batteries, and customized batteries usable in connection with a certain electric or electronic device.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A battery container for receiving a battery to provide a desired electric current to an electric device, the battery container comprising:
    a main body including a plurality of side portions and a rear portion and thereby defining at least a partial enclosure for accommodating at least one battery therein, the rear portion of the main body having first and second electrodes to provide a contact respectively with first and second electrodes of the at least one battery, the main body further defining a front opening for receiving and discharging the at least one battery there-through;
    a front electrode plate operably attached to the front opening of the main body such that, when the front electrode plate is in a closed position, an electrical connection can be achieved between the at least one battery positioned within the enclosure and the first and second electrodes of the rear portion of the main body via the front electrode plate to provide an electric current to the electric device; and
    wherein the main body is configured to selectively accommodate therein one battery or a set of batteries selected from a group consisting of two AA type batteries, one CRV3 battery, and one customized battery of rectangular shape adapted for use with the electric device, and wherein the main body includes a wrong-insertion preventing element for preventing incorrect insertion of the CRV3 battery into the enclosure of the main body, and the main body further includes another wrong-insertion preventing element for preventing incorrect insertion of the customized battery into the enclosure of the main body.

2. The battery container of claim 1 further including a cover attachable over the front electrode plate for securely closing of the front opening of the main body.

3. The battery container of claim 1, wherein each of the wrong-insertion preventing elements is generally in the shape of a protrusion disposed at the side portions.

4. The battery container of claim 1, wherein the main body further includes a means for biasing at least one of the AA type battery towards one of the plurality of side portions.

5. The battery container of claim 4, wherein the biasing means is generally in the shape of a protrusion disposed at one of the side portions.

6. The battery container of claim 1, wherein the main body further includes a holding member for securely holding one end portion of the customized battery.

7. The battery container of claim 1, wherein the front electrode plate is attached to the main body by a hinge connection.

8. The battery container of claim 1, wherein the front electrode plate includes a first and a second electrode contacts protruded from an inner surface of the front electrode plate.

9. The battery container of claim 1 further including a detection member for detecting insertion of the customized battery within the enclosure of the main body.

10. The battery container of claim 2 further including means for blocking an electrical connection between at least one of the AA type batteries and the front electrode plate when the AA type batteries are inserted within the enclosure of the main body in a wrong direction.

11. The battery container of claim 10, wherein the electrical connection blocking means includes at least one protrusion disposed at an inner surface of the cover.

12. The battery container of claim 11, wherein the electrical connection blocking means further includes at least one through hole disposed at the front electrode plate.

13. The battery container of claim 1, wherein the battery container is adapted for use with a camera.

14. A battery container for receiving a battery for an electric device, the battery container comprising:
    a housing defining at least a partial enclosure for accommodating at least one battery therein, the housing including a wall portion with first and second electrodes disposed thereon to provide a contact respectively with first and second electrodes of the at least one battery, the housing further defining an opening for receiving and discharging the at least one battery there-through;
    a covering member including a conductive element disposed at an inner surface thereof and being operably attached to the opening of the housing such that, when the covering member is in a closed position, an electrical connection can be achieved between the at least one battery positioned within the enclosure, the first and second electrodes of the wall portion of the main body, and the conductive element of the covering member to provide an electric current to the electric device; and
    wherein the housing is configured to selectively accommodate therein one battery or a set of batteries selected from a group consisting of two AA type batteries, one CRV3 battery, and one customized battery of rectangular shane particularly adapted for use with the electric device, and wherein the housing includes a wrong-insertion preventing member for preventing incorrect insertion of the CRV3 battery into the enclosure of the housing, and the main body further includes another wrong-insertion preventing member for preventing incorrect insertion of the customized battery into the enclosure of the housing, the battery container further including an electrical connection blocking element for blocking an electrical connection between at least one of the AA type batteries and the conductive element of the covering member when the AA type batteries are inserted within the enclosure of the housing in a wrong direction.

15. The battery container of claim 14, wherein the conductive element is an electrode end-plate operably associated with the covering member.

16. The battery container of claim 14, wherein each of the wrong-insertion preventing members of the housing is generally in the shape of a longitudinally extending protrusion for respectively engaging with corresponding wrong-insertion preventing portions of the CRV3 battery and the customized battery.

17. A battery container for receiving a battery for an electric device, the battery container comprising:
    a housing defining at least a partial enclosure for accommodating at least one battery therein, the housing including a wall portion with first and second electrodes disposed thereon to provide a contact respectively with first and second electrodes of the at least one battery, the housing further defining an opening for receiving and discharging the at least one battery therethrough;

a covering member including a conductive element disposed at an inner surface thereof and being operably attached to the opening of the housing such that, when the covering member is in a closed position, an electrical connection can be achieved between the at least one battery positioned within the enclosure, the first and second electrodes of the wall portion of the main body, and the conductive element of the covering member to provide an electric current to the electric device; and wherein the housing is configured to selectively accommodate therein one battery or a set of batteries selected from a group consisting of two batteries of cylindrical shape, one battery of generally oval shape with two circular sides and two generally flat wide sides, one wide sides of which including a recessed portion formed therein, and one battery of generally rectangular shape including a recessed portion formed therein, and wherein the housing includes a wrong-insertion preventing member for preventing incorrect insertion of the one battery of generally oval shape into the enclosure of the housing, and the main body further includes another wrong-insertion preventing member for preventing incorrect insertion of the one battery of generally rectangular shape into the enclosure of the housing.

18. The battery container of claim 17, wherein the two batteries of cylindrical shape are AA type batteries, the one battery of generally oval shape is a CRV3 battery, and the one battery of generally rectangular shape is a customized battery adapted for use with the electric device.

19. The battery container of claim 17, wherein each of the wrong-insertion preventing members of the housing is generally in the shape of a longitudinally extending protrusion for respectively engaging with the corresponding recessed portions of the one battery of generally oval shape and the one battery of generally rectangular shape.

20. The battery container of claim 17, further including a detection member for detecting receiving of the one battery of generally rectangular shape in the housing.

\* \* \* \* \*